Nov. 20, 1956
C. S. BASS
2,770,986
AGRICULTURAL DISC SHARPENER
Filed March 13, 1953
3 Sheets-Sheet 1
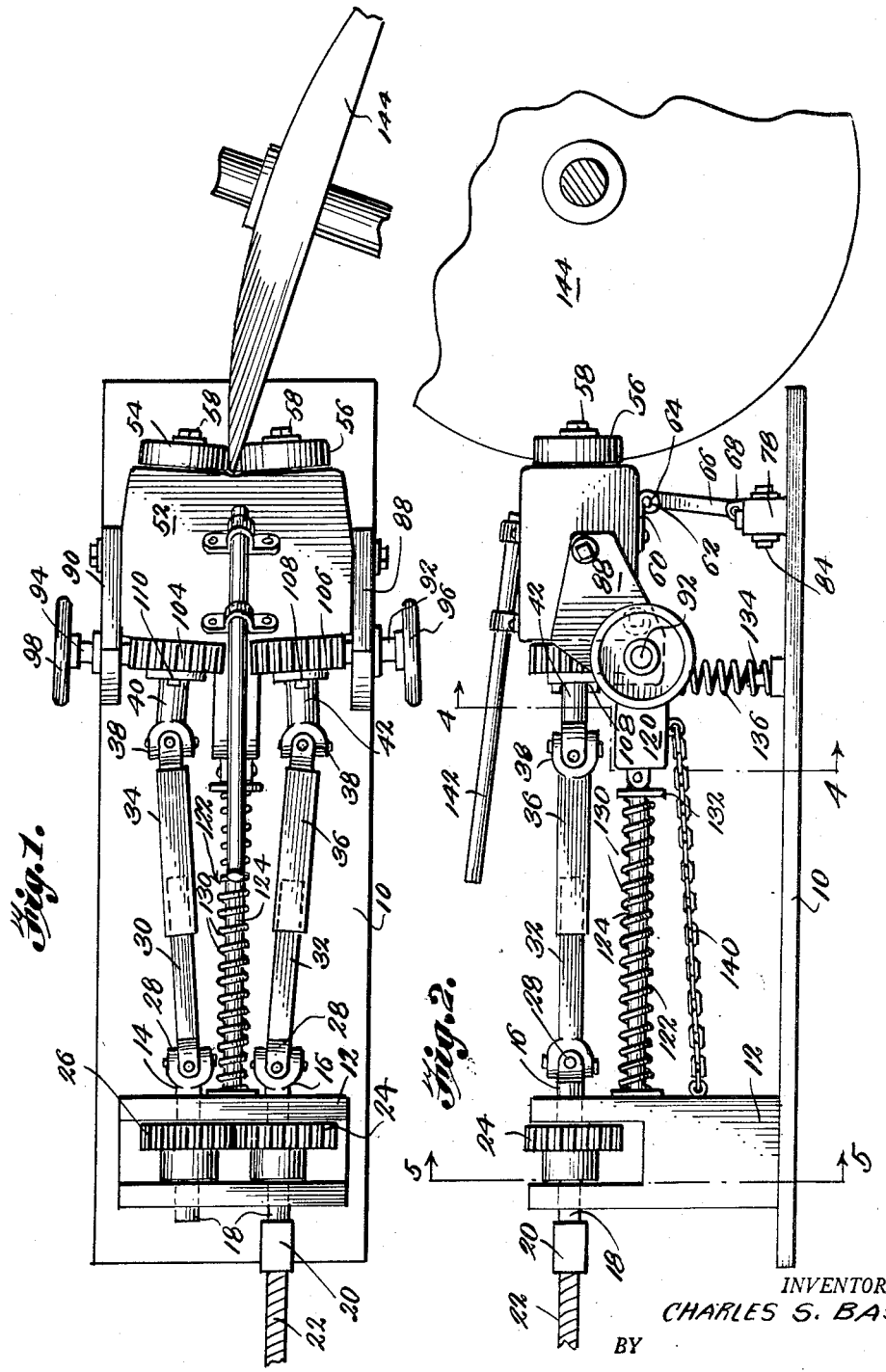
INVENTOR.
CHARLES S. BASS
BY
Patrick D. Beavers
ATTORNEY Nov. 20, 1956     C. S. BASS     2,770,986
AGRICULTURAL DISC SHARPENER
Filed March 13, 1953     3 Sheets-Sheet 2
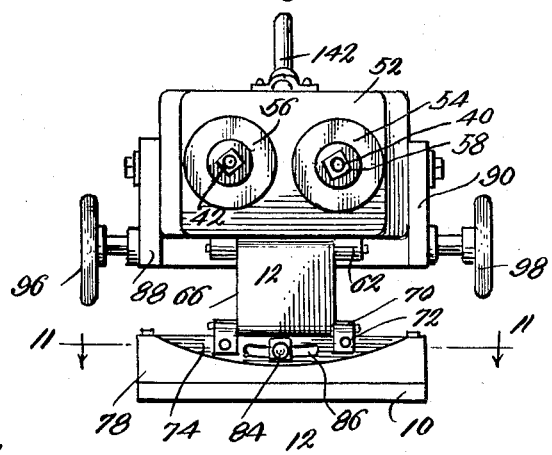
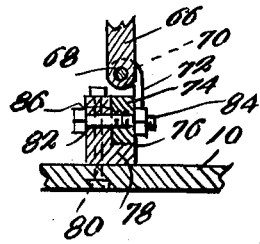
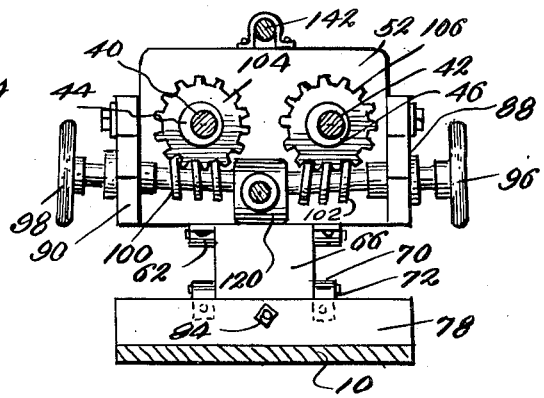
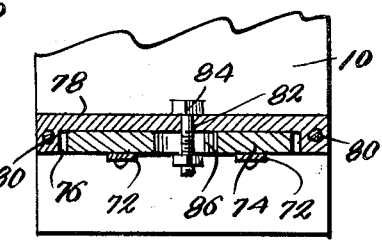
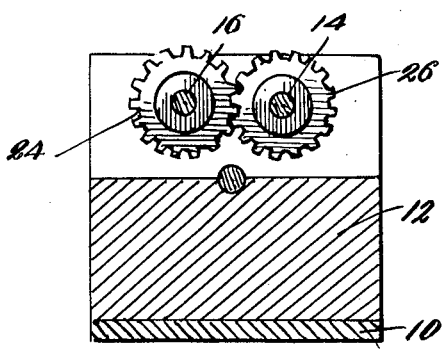
INVENTOR.
CHARLES S. BASS
BY
Patrick D. Beavers
ATTORNEY Nov. 20, 1956  C. S. BASS  2,770,986
AGRICULTURAL DISC SHARPENER
Filed March 13, 1953  3 Sheets-Sheet 3
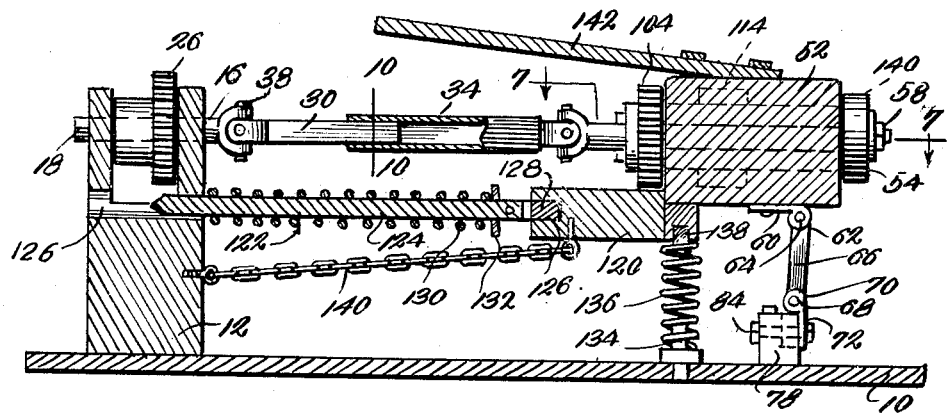
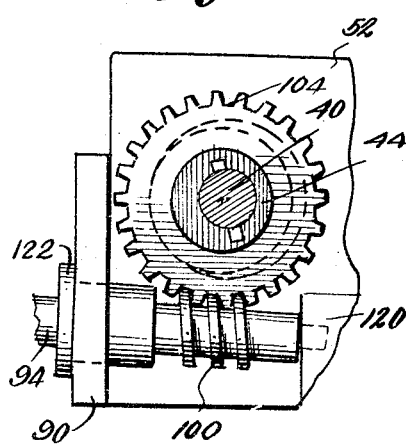
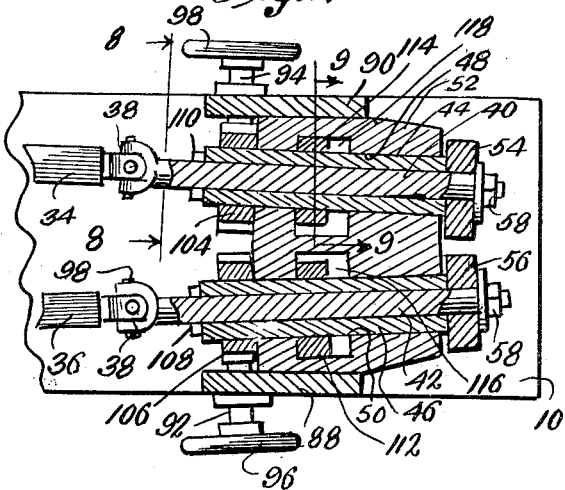
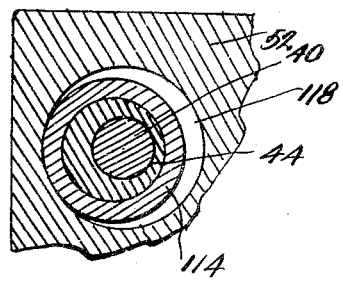
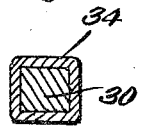
INVENTOR.
CHARLES S. BASS
BY
Patrick D Beavers
ATTORNEY United States Patent Office 2,770,986
Patented Nov. 20, 1956

2,770,986
AGRICULTURAL DISC SHARPENER
Charles S. Bass, Plainview, Tex.
Application March 13, 1953, Serial No. 342,091
5 Claims. (Cl. 76—89.2)

This invention appertains to improvements in sharpening apparatus for agricultural implements such as disc harrows, disc plows, disc cultivators and the like.

A primary object of this invention is to provide a portable apparatus for sharpening by a roller pressure method the discs of an agricultural apparatus.

A further object of this invention is to provide cooperating pressure rollers which engage the opposing faces of a disc at its periphery and exert cooperative pressure in a novel manner to cause the periphal edge of the disc to spread radially outwardly in a controlled manner while the shape remains the same and strength is not diminished. A further object of this invention is to stress the peripheral edge of a disc beyond its limit of elasticity with coacting rollers to cause the material to flow radially outwardly thereby increasing the diameter of the disc and producing the desired beveled peripheral cutting edge.

A still further object of this invention is to provide means for supporting the rollers in a manner so that they can act on the discs without necessitating the removal of the discs from the harrow or cultivator or the like machine and in a manner so that the pressure applied thereby on the discs can be easily adjusted.

Another object of this invention is to provide a head which carries the pressure rollers and houses a means for adjusting them bodily towards and away from each other and which is pivotable about axes substantially parallel with the axes of rotation of the rollers and also oscillatable about an axis transverse to the axis of rotation of the rollers, such adjustment of the head being provided to control the angle of attack of the rollers and the travel thereof with respect to the faces of a disc.

A further object of this invention is to provide automatic pressure means acting on the head to tilt it about the axis transverse to the axis of rotation of the rollers and means limiting the forward movement of the head, that is, toward the disc which it is facing, as the rollers are in engagement with the opposing faces of the disc.

Yet another object of this invention is to provide a drive means which permits of the adjustment of the head and the rollers and is operative under any adjustment condition.

These and ancillary objects are attained by this invention, the best known embodiment of which is set forth herein and illustrated in the accompanying drawings, wherein:

Figure 1 is a top plan view of a disc sharpening device constructed in accordance with this invention and showing the pressure rollers in use and in contact with the opposing faces of a conventional disc.

Figure 2 is a side elevational view;

Figure 3 is a front elevational view;

Figure 4 is a cross-sectional view taken on line 4—4 of Figure 2 and showing in detail the means for moving the rollers bodily toward and away from each other;

Figure 5 is a cross-sectional view taken on line 5—5 of Figure 2 and showing the meshing gear arrangement of the drive means;

Figure 6 is a longitudinal vertical sectional view taken along the longitudinal center line of the device;

Figure 7 is a longitudinal horizontal sectional view taken on line 7—7 of Figure 6 and showing the means for moving the rollers bodily toward and away from each other;

Figure 8 is a cross-sectional detail view taken on line 8—8 of Figure 7;

Figure 9 is a cross-sectional detail view taken on line 9—9 of Figure 7;

Figure 10 is a cross-sectional detail view taken on line 10—10 of Figure 6;

Figure 11 is a cross-sectional view taken on line 11—11 of Figure 3, and

Figure 12 is a vertical sectional view taken on line 12—12 of Figure 3.

Referring more particularly to the drawings, the sharpening device includes a base 10 on one end of which a gear box 12 is mounted in an upstanding manner. Journalled in the gear box 12 are parallel shafts 14 and 16, the outer ends 18 of which are non-circular for insertion in a complemental socket 20 on the end of a flexible shaft 22, which is suitably connected to a power source. Meshing gears 24 and 26 are carried by the shafts 14 and 16 and disposed within the gear box 12 for power transfer so that the drive shaft 22 can be connected to either shaft dependent upon the desired direction of rotation of the shafts 14 and 16.

Connected by universal joints 28 to the shafts 14 and 16 are shafts 30 and 32, which telescope in tubular shafts 34 and 36, all of said shafts being non-circular for freedom of axial movement but fixed for rotation (Figure 10). The shafts 30, 34 and 32, 36 diverge from the shafts 14 and 16 and are connected by universal joints 38 to to roller shafts 40 and 42.

The roller shafts 40 and 42 are rotatably mounted in bearing sleeves 44 and 46 which are rotatably positioned in slightly forwardly converging longitudinally extending bores 48 and 50 that are formed in a head 52, it being apparent that the sleeves 44 and 46 are eccentric members in that the openings through which the shafts 40 and 42 are mounted are eccentric with respect to the body of the sleeve in each case and that the axis of such opening is parallel to the axis of the outer surface of the sleeve. Coacting rollers 54 and 56 of hardened steel are secured on the protruding forward ends of shafts 40 and 42 by nuts 58.

The head 52 has a hinge plate 60 attached to its underside, the knuckle 62 of the plate 60 being pivoted on a horizontal axis by a pin 64 to a vertical member 66. The lower end of the member 66 is pivoted by a pin 68 to the eye ends 70 of upstanding arms 72. The arms 72 are secured to and arcuate block 74, which is mounted for angular sliding movement in a groove 76 formed vertically in a support 78. The support 78 is anchored by bolts 80 to the base 10 and has a transverse opening 82 for a bolt 84. The bolt 84 extends through an elongated arcuate slot 86 in the block 74 and serves to lock the block in various adjusted positions.

Flat members or plates 88 and 90 are fastened to the sides of the head 52 and serve as journal supports for shafts 92 and 94, which are rotatably carried thereby. Hand wheels 96 and 98 are suitably fixed to the outer ends of the shafts and worms 100 and 102 are provided on their inner ends. The worms 100 and 102 are enmeshed with gears 104 and 106 that are fixedly circumposed on the rearward ends of the sleeves 44 and 46, within which the shafts 40 and 42 freely rotate. Shoulders 108 and 110 are provided on the shafts 40 and 42 and abut the rear ends of the sleeves to locate the shafts axially in cooperation with the rollers.

The sleeves are provided with annular bearing shoulders 112 and 114, as shown in Figures 7 and 9, that are disposed in annular openings 116 and 118 in the head and arranged radially around the bores 48 and 50. Thus, by manually rotating the hand wheels 96 and 98, the sleeves 44 and 46 are rotated through the meshing worms 100 and 102 and the gears 104 and 106 and ride in their bearing shoulders 112 and 114 to move the shafts 40 and 42 and bring the rollers toward each other or move them bodily apart. The inner ends of the shafts 92 and 94 are journalled in the sides of a rearward projection 120 on the head 52 and the shafts rotate in bearing collars 122 in the plates 88 and 90, as shown in Figure 8.

To exert a forward pressure on the head 52, a pressure unit 122 is provided as shown particularly in Figure 6. The unit 122 includes a rod 124 which is slidably disposed at its rear end in an opening 126 in the gear box. The rod is parallel with the telescopic driving shafts and has its front end universally connected to a stick member 128 that is slidably disposed in an axial opening in the projection 120. A spring 130 is coiled on the rod and bears at its forward end against an abutment 132 which extends radially from the shaft.

A spring support is also provided under the head 52 to bias the head upwardly and slightly forwardly and to permit free and easy swinging movement of the head when changing or controlling the travel of the rollers 54 and 56 on a disc. The spring support acts as a shock absorber. The spring support includes a lug 134 upstanding from the base and on which one end of a coil spring 136 is mounted and a lug 138 which depends from the head to receive the upper end of the spring 136.

To limit the forward swinging movement of the head 52, a flexible limit member or chain 140 is provided and is attached at one end to the gear box 12, at its other end to the projection 120. To assist in moving the head, a handle or lever 142 is provided and is attached at one end to the top of the head and extends upwardly and rearwardly therefrom.

It will be noted that the head 52 is solid with only the bores 48 and 50 formed therethrough so that no weakening openings are made in the sides of the head where the greatest strain would occur. Also, no adjustments are provided or placed on the head 52 so that nothing can interfere with the rotation of the discs 144, as they are being sharpened. The head is very strong, either being a solid block of metal or two or more parts welded together, so as to withstand the strain of pressure outwardly imposed on it when pressure is applied to the disc 144 by the rotating rollers 54 and 56.

The pressure exerted by the rollers 54 and 56 in the disc 144 can be adjusted by the rotation of the sleeves 44 and 46, as aforedescribed, which rotation moves the rollers bodily toward or away from each other. The faces of the rollers are oval which gives the pressure a spreading effect on the disc, as the rollers are rotated in tight frictional contact with the opposing faces of the disc.

By providing the telescopic driving shafts 30, 34 and 32, 36 and their universal connections to shafts 14 and 16 and roller shafts 40 and 42, the head can be moved or rocked backward and forward about its horizontal parallel pivots and the angle of divergence between the rollers and the work can be adjusted and under any such operating conditions there will still be an efficient driving connection.

In use, the device is positioned in relation to a disc 144 (which is still on the gang shaft and attached to the implement) so that the rollers 54 and 56 straddle the peripheral edge of the disc. The rollers are brought into contacting engagement with the opposing faces of the disc, under the desired pressure, by rotating the sleeves 44 and 46. Power is then applied to either the shafts 14 and 16 so as to turn the rollers in a direction that will cause them to move or roll upward on the disc 144. The disc rotates counterclockwise or down toward the ground. The travel of the rollers closer to or away from the edge of the disc is controlled by tilting or rocking the head 52 through the medium of the hand lever 142.

The rotation of the disc between the rollers, as pressure is applied by the rollers, mashes and spreads the disc until the desired smooth beveled cutting edge is obtained.

Of course, while the best known form of this invention has been disclosed herein, it is by way of example only as other forms may be made, as come within the purview of the appended claims.

Having thus described the invention, what is claimed as new is:

1. A disc sharpener for discs which are rotatably supported by an implement frame comprising a frame, a head pivotally mounted on the frame, rotary shafts mounted in the head at a slightly divergent angle, a pair of side by side pressure rollers on said shafts adapted to straddle a disc and engage the opposing faces thereof adjacent its edge, said head being pivotable about an axis substantially transverse to the axis of rotation of the rollers to move the rollers nearer to and away from the edge of the disc, and means for moving said rollers bodily toward and away from each other to adjust the pressure exerted thereby on the disc, said last means including eccentric sleeves in said head within which the roller shafts rotate, gears on said sleeves, and worms enmeshed with the gears to rotate the sleeves.

2. A disc sharpener for discs which are rotatably supported by an implement frame comprising a frame, a head pivotally mounted on the frame, rotary shafts mounted in the head at a slightly divergent angle, a pair of side by side pressure rollers on said shafts adapted to straddle a disc and engage the opposing faces thereof adjacent its edge, said head being pivotable about an axis substantially transverse to the axis of rotation of the rollers to move the rollers nearer to and away from the edge of the disc, and means for moving said rollers bodily toward and away from each other to adjust the pressure exerted thereby on the disc, said last means including eccentric sleeves in said head within which the roller shafts rotate, gears on said sleeves, and worms enmeshed with the gears to rotate the sleeves, said worms being provided on shafts extending laterally from the end of the head opposite the rollers and said last shafts having hand operating means thereon.

3. A disc sharpener for discs which are rotatably supported by an implement frame comprising a frame, a head pivotally mounted on the frame, rotary shafts mounted in the head at a slightly divergent angle, a pair of side by side pressure rollers on said shafts adapted to straddle a disc and engage the opposing faces thereof adjacent its edge, said head being pivotable about an axis substantially transverse to the axis of rotation of the rollers to move the rollers nearer to and away from the edge of the disc, and means for moving said rollers bodily toward and away from each other to adjust the pressure exerted thereby on the disc, said last means including eccentric sleeves in said head within which the roller shafts rotate, gears on said sleeves, and worms enmeshed with the gears to rotate the sleeves, and telescopic and universal drive means connected to the roller shafts.

4. A disc sharpener for discs which are rotatably supported by an implement frame comprising a frame, a head pivotally mounted in the frame, rotary shafts mounted in the head at a slightly divergent angle, a pair of side by side pressure rollers on said shafts adapted to straddle a disc and engage the opposing faces thereof adjacent its edge, said head being pivotable about an axis substantially transverse to the axis of rotation of the rollers to move the rollers nearer to and away from the edge of the disc, and means for moving said rollers bodily toward and away from each other to adjust the pressure exerted thereby on the disc, said last means including eccentric sleeves in said head within which the roller shafts rotate, gears on said sleeves, and worms enmeshed with the gears to rotate the sleeves, a base on which the head is pivotally mounted, and shock absorber means interposed between the base and the head.

5. A disc sharpener for discs which are rotatably supported by an implement frame comprising a frame, a head pivotally mounted on the frame, rotary shafts mounted in the head at a slightly divergent angle, a pair of side by side pressure rollers on said shafts adapted to straddle a disc and engage the opposing faces thereof adjacent its edge, said head being pivotable about an axis substantially transverse to the axis of rotation of the rollers to move the rollers nearer to and away from the edge of the disc, and means for moving said rollers bodily toward and away from each other to adjust the pressure exerted thereby on the disc, said last means including eccentric sleeves in said head within which the roller shafts rotate, gears on said sleeves, and worms enmeshed with the gears to rotate the sleeves, and means associated with the head for moving the head toward the edge of the disc.

References Cited in the file of this patent

UNITED STATES PATENTS

| | | |
|---|---|---|
| 141,012 | Pillings | July 22, 1873 |
| 204,393 | Trethewey | May 28, 1878 |
| 609,847 | Sumner | Aug. 30, 1898 |
| 929,904 | Ware | Aug. 3, 1909 |
| 1,004,817 | Quiry | Oct. 3, 1911 |
| 2,122,978 | Eldridge et al. | July 5, 1938 |
| 2,477,205 | Reimer | July 26, 1949 |
| 2,571,632 | Vinell et al. | Oct. 16, 1951 |
| 2,662,572 | Goodell et al. | Dec. 15, 1953 |

FOREIGN PATENTS

| | | |
|---|---|---|
| 469 | Great Britain | Jan. 12, 1915 |
| 67,623 | Switzerland | Jan. 12, 1914 |